(12) United States Patent
Xu et al.

(10) Patent No.: US 8,984,318 B2
(45) Date of Patent: Mar. 17, 2015

(54) SYSTEM AND METHOD TO AVOID RESYNCHRONIZATION WHEN PROTECTING MULTIPLE SERVERS

(75) Inventors: Zhenghua Xu, Beijing (CN); Ran Shuai, Beijing (CN); Min Yan, Beijing (CN); Guodong Li, Beijing (CN)

(73) Assignee: CA, Inc., New York, NY (US)

( * ) Notice: Subject to any disclaimer, the term of this patent is extended or adjusted under 35 U.S.C. 154(b) by 1110 days.

(21) Appl. No.: 12/983,518

(22) Filed: Jan. 3, 2011

(65) Prior Publication Data

US 2012/0173913 A1 Jul. 5, 2012

(51) Int. Cl.
*G06F 15/177* (2006.01)
*G06F 11/16* (2006.01)
*G06F 11/20* (2006.01)

(52) U.S. Cl.
CPC ........ *G06F 11/2041* (2013.01); *G06F 11/2097* (2013.01); *G06F 11/1658* (2013.01); *G06F 11/2048* (2013.01)
USPC .............. 713/375; 714/4.11; 714/10; 714/11; 714/12; 714/13

(58) Field of Classification Search
CPC ... G06F 11/16; G06F 11/1658; G06F 11/202; G06F 11/2028; G06F 11/1675
USPC .................. 713/375; 714/4.11, 10, 11, 12, 13
See application file for complete search history.

(56) References Cited

U.S. PATENT DOCUMENTS

| | | | | |
|---|---|---|---|---|
| 4,941,087 | A * | 7/1990 | Kap | 710/260 |
| 5,488,716 | A * | 1/1996 | Schneider et al. | 714/10 |
| 7,003,692 | B1 * | 2/2006 | Banks et al. | 714/12 |
| 2003/0028746 | A1* | 2/2003 | Durrant | 711/206 |
| 2006/0150024 | A1* | 7/2006 | Abe | 714/38 |
| 2010/0229029 | A1* | 9/2010 | Frazier, II | 714/5 |
| 2011/0191627 | A1* | 8/2011 | Koning et al. | 714/5.1 |

* cited by examiner

*Primary Examiner* — Kim Huynh
*Assistant Examiner* — Brandon Kinsey
(74) *Attorney, Agent, or Firm* — Schwegman Lundberg & Woessner, P.A.

(57) ABSTRACT

In a computer system, a standby master processor is configured to serve as a backup processor for an active master processor. A third party replica processor is configured to monitor and record changes on the active master processor when the active master processor is executing, and is further configured to synchronize itself with the standby master processor when the standby master processor takes over execution from the active master processor. Logs of changes are maintained. A negotiation occurs between the standby master processor and the third party replica processor to determine the status of the logs of the standby master processor and the third party replica processor, and logs are applied or paused relating to one or more of the standby master processor and the third party replica processor to synchronize the standby master processor and the third party replica processor.

15 Claims, 19 Drawing Sheets

SYSTEM AND METHOD TO AVOID RESYNCHRONIZATION WHEN PROTECTING MULTIPLE SERVERS

TECHNICAL FIELD

The present disclosure relates to the field of backup systems and resynchronization, and in an embodiment, but not by way of limitation, a system and method to avoid resynchronization when protecting multiple servers.

BACKGROUND

Commercial software becomes more sophisticated on an ongoing basis, not only in the services it brings, but also in built-in mechanisms to achieve high availability. For certain kinds of servers, the crucial parts possess several copies tended by related failsafe mechanisms to guarantee that once the functioning part is down, a copy can replace it instantly to maintain the service flow. Generally, such high availability mechanisms include an active server or processor and a passive server or processor, wherein the passive server keeps track of the state of execution of the active server by receiving regular updates from the active server. If the active server fails for any reason, the passive server takes over execution from the active server.

Even with high availability functionalities as described above however, there are still situations in which problems can occur. The art would benefit from a system that addresses such problems.

SUMMARY

In an embodiment, a process includes providing in a computer system an active master processor, a standby master processor, and a third party replica processor. The standby master processor is configured to serve as a backup processor for the active master processor, the third party replica processor is configured to monitor and record changes on the active master processor when the active master processor is executing, and the third party replica processor is further configured to synchronize itself with the standby master processor when the standby master processor takes over execution from the active master processor. The active master processor, the standby master processor, and the third party replica processor are configured to maintain a log of changes within the active master processor, transmit the log of changes to the standby master processor and the third party replica processor, maintain a latest consistent point of change between the active master processor and the third party replica processor, determine a latest log on the active master processor that has been written to disk, negotiate between the standby master processor and the third party replica processor to determine the status of the logs of the standby master processor and the third party replica processor, and apply logs or pause logs to one or more of the standby master processor and the third party replica processor to synchronize the standby master processor and the third party replica processor.

DETAILED DESCRIPTION

To address the shortcomings of the prior art, a third party replica, equipped with unique and independent ways of data replication, acts as an additional failsafe layer for protection.

Figure 1:
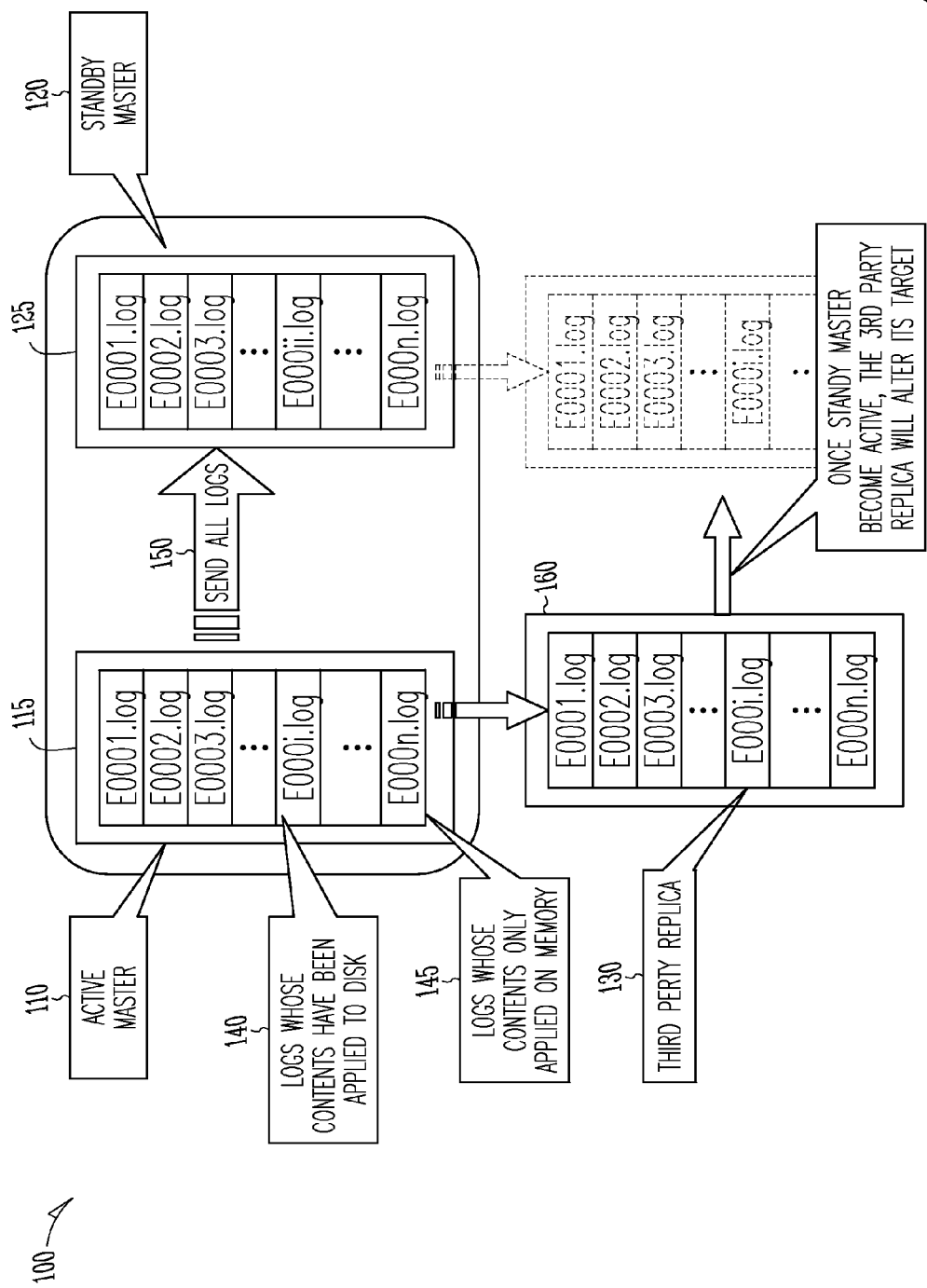
FIG. 1 illustrates a system with an active master, a standby master, and a third party replica.

FIG. 1 illustrates a system 100 that includes an active master 110, a standby master 120, and a third party replica 130. FIG. 1 further illustrates that the active master 110 includes logs that have been applied to disk at 140, and logs whose contents have only been applied to memory at 145. The active master transmits the logs to the standby master at 150. The third party replica 130 follows the logs 140, 145 of the active master 110, and maintains its copy of the logs at 160.

Compared with the standby master 120, the third party replica 130 usually takes a different view for the same purpose. Although still based on logs, the third party replica 130 keeps in step in real time with that of the active master 110. However, when a transfer from the active master 110 to the standby master 120 occurs, the third party replica 130 needs to alter its target, which also means, it needs to do something to make sure that the data it hosts match the status with that of incoming active master (i.e., the standby master 120). Considering that the transfer might be caused by any kind of exceptions, data consistency between the former active master 110 and incoming active master (standby master 120) may be totally corrupted. The third party replica 130 should address this inconsistency. A simple procedure would be to let the third party replica 130 perform a new round of synchronization between itself and the incoming active master (standby master 120). While this is theoretically possible, the data may be extremely voluminous, and/or the network bandwidth may be quite limited.

To avoid such a time consuming resynchronization, one or more embodiments provide a negotiation algorithm in order to find the latest consistent point between the active master 110 and the third party replica 130. The negotiation permits the third party replica 130 to regain a consistent status with the incoming active master (standby) 120 without complete resynchronization. The negotiation algorithm is based mainly on log files. As mentioned above, log files record all the changes that have happened on the active master 110 and that have been referenced by the standby master 120 to update its own status. The following possible conditions are dealt with by the negotiation.

In a first scenario, a transfer between the active master 110 and the standby master 120 is completed without any exceptions. This means that the log files of the former active master 110 were completely copied to the incoming active (standby) master 120, which further means that the log file sets are exactly the same at the very moment when transfer from the active master 110 to the standby master 120 is executed. Additionally, for the former active master 110, the log which it was replaying immediately before transfer was completely applied, which means every modification operation recorded in that log file has been applied to disk.

In a second scenario, the transfer between the active master 110 and the standby master 120 is done with an exception. The log files of the former active master 110 were not completely copied to the current active (standby) master 120, which means the log file sets of the active master 110 and the standby master 120 are different at the very moment when transfer is executed. Additionally, for the former active master 110, the log which it was replaying immediately before transfer was completely applied, which further means that every modification operation recorded in that log file has been applied to disk.

In a third scenario, the transfer between the active master 110 and the standby master 120 is done with an exception. The log files of the former active master 110 were completely copied to the current active master 110, which further means that the log file sets are the same when transfer is executed. Additionally, for the former active master, the log file that it was applying immediately before the transfer was not fully implemented. Rather, only some modifications of that log file were applied.

Figure 2:
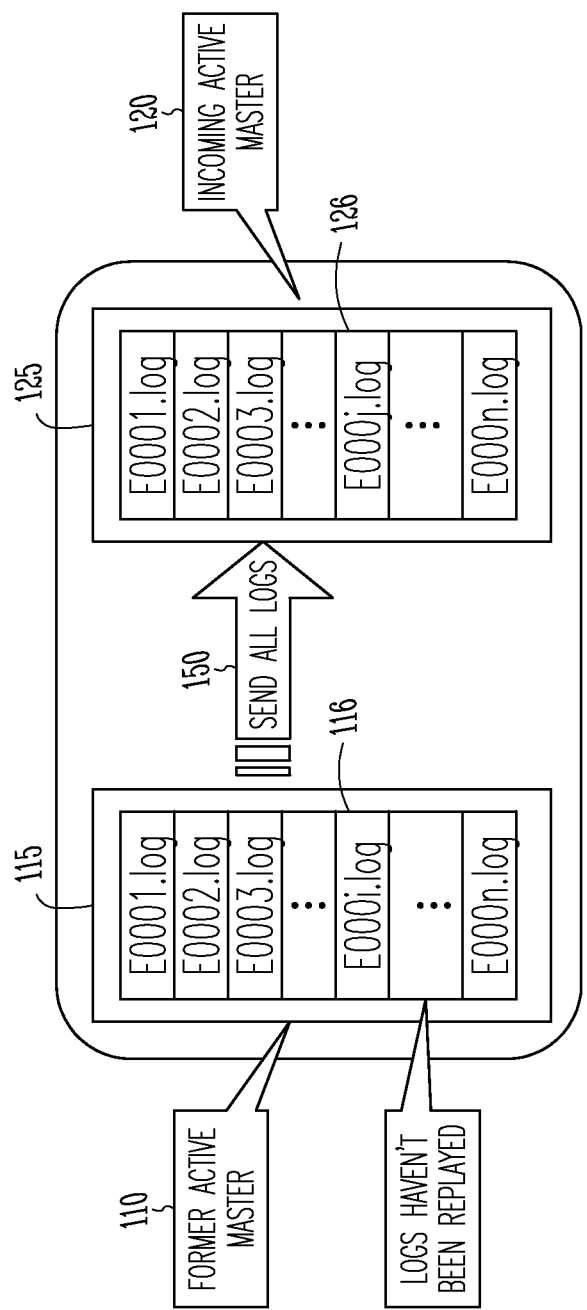
FIG. 2 illustrates a transfer of log files from a former active master to an incoming active master in which no exception has occurred.
Figure 3:
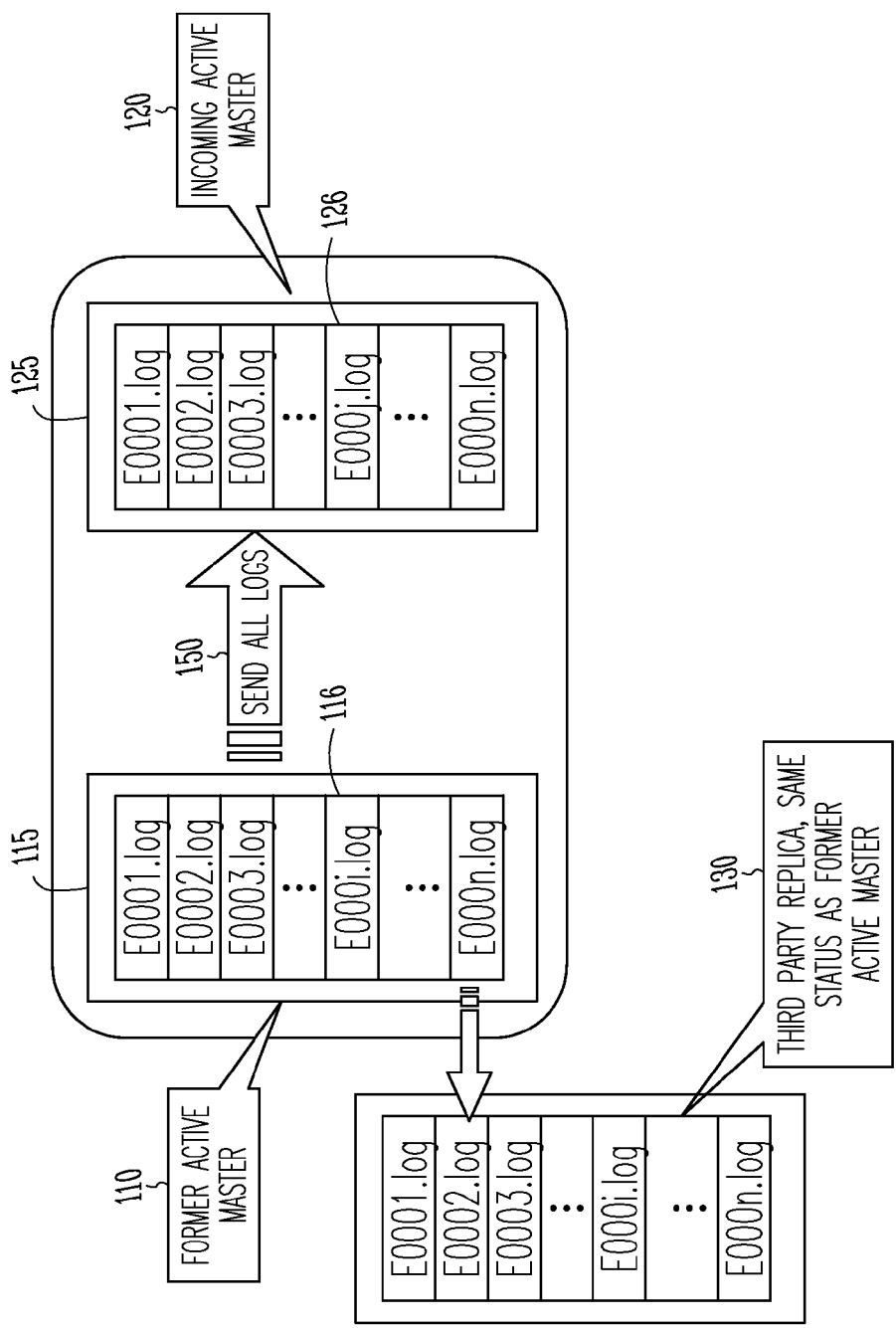
FIG. 3 illustrates a transfer of log files from a former active master to an incoming active master, and a third party replica that has kept current with the former active master.
Figure 4:
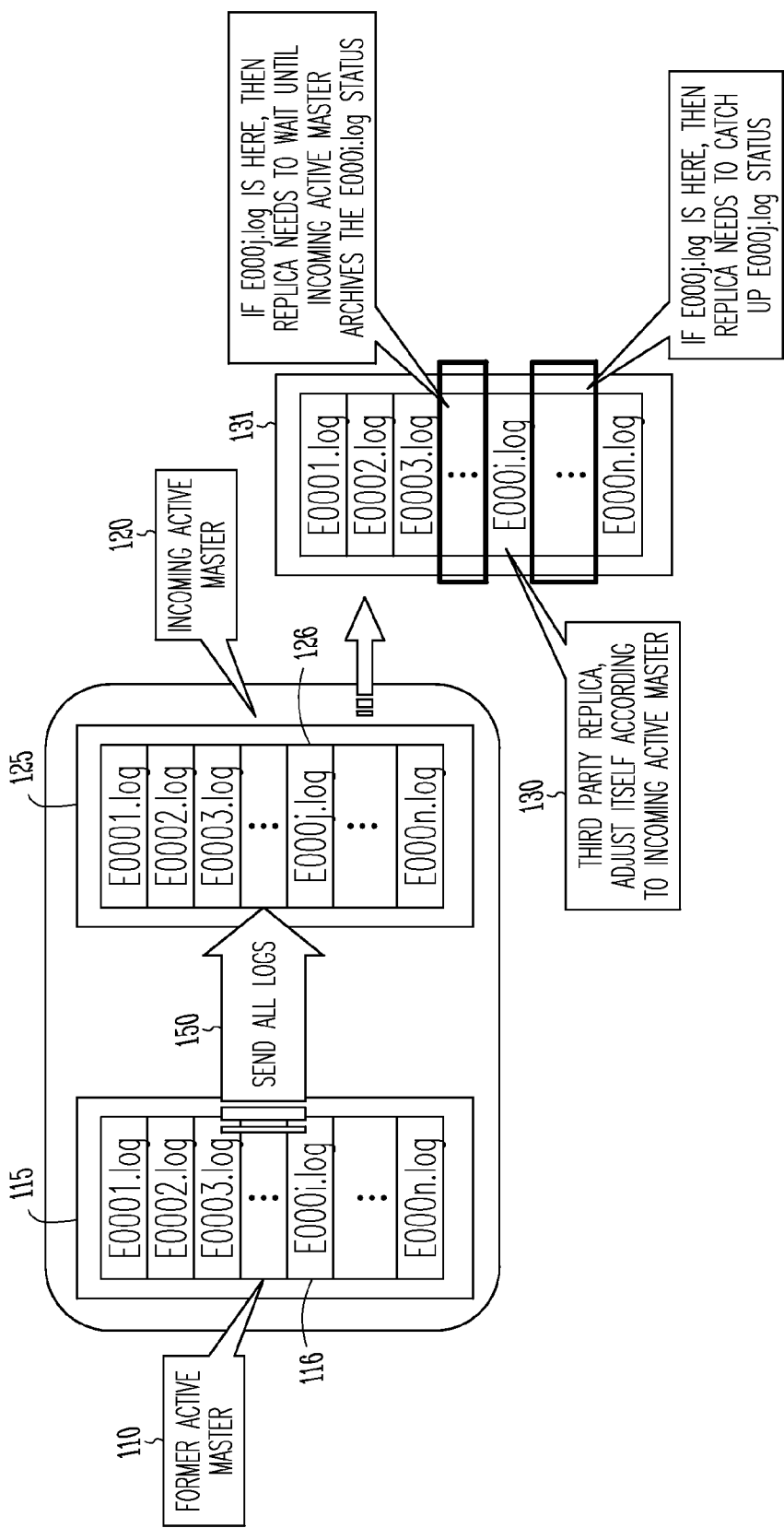
FIG. 4 illustrates the manner of one scenario in which a third party replica server adjusts itself after transfer of control from a former active master server to an incoming master server.
Figure 5:
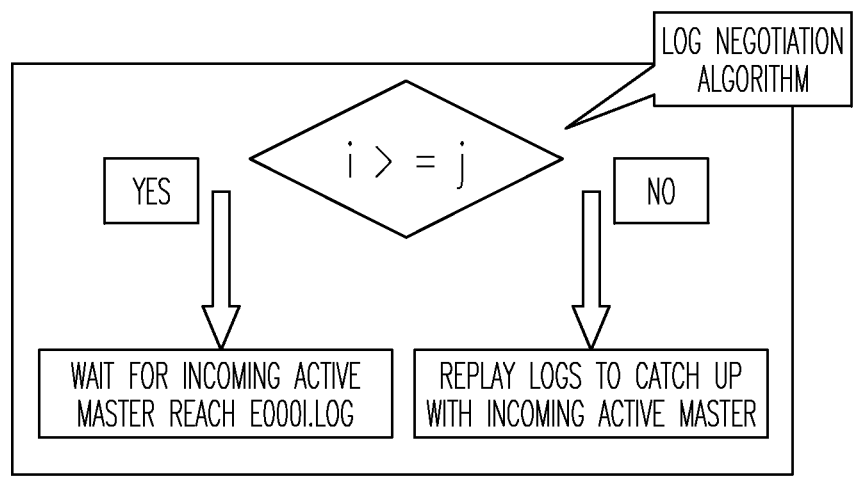
FIG. 5 is a process permitting a third party replica server to resynchronize with an incoming active master server.

FIG. 2 illustrates the first scenario, in which no exception has occurred (that is, the former active master 110 ends its services with decency—the last log was completely applied and all log files were dumped to the incoming active master as illustrated in FIG. 3). FIG. 3 illustrates that the log file sets 115, 125 are exactly the same between the former active master 110 and the incoming active (standby) master 120. Referring to FIG. 3, for the former active master 110, its last replay log is the E000i.log 116, and this log file is completely rather than partially implemented. Under this situation, the only inconsistency between the former active master 110 and the incoming active (Standby) master 120 is the degree of the log file implementation. The former active master 110 is at the level of E000i.log 116, while the incoming active (Standby) master 120 is at the level of E000j.log 126. FIG. 3 illustrates the third party replica 130 maintaining exactly the same status as that of former active master 110. FIG. 4 illustrates the manner in which the negotiation algorithm finds the last consistent point in the log files 115, 126 between the former active master 110 and the incoming active (standby) master 120. After the transfer is executed, the third party replica 130 adjusts itself at 131 so that it is consistent with the incoming active (standby) master 120, as is illustrated in FIG. 4. FIG. 5 illustrates how the log negotiation algorithm permits the third party replica server 130 to resynchronize with the incoming active (standby) master 120.

Figure 6:
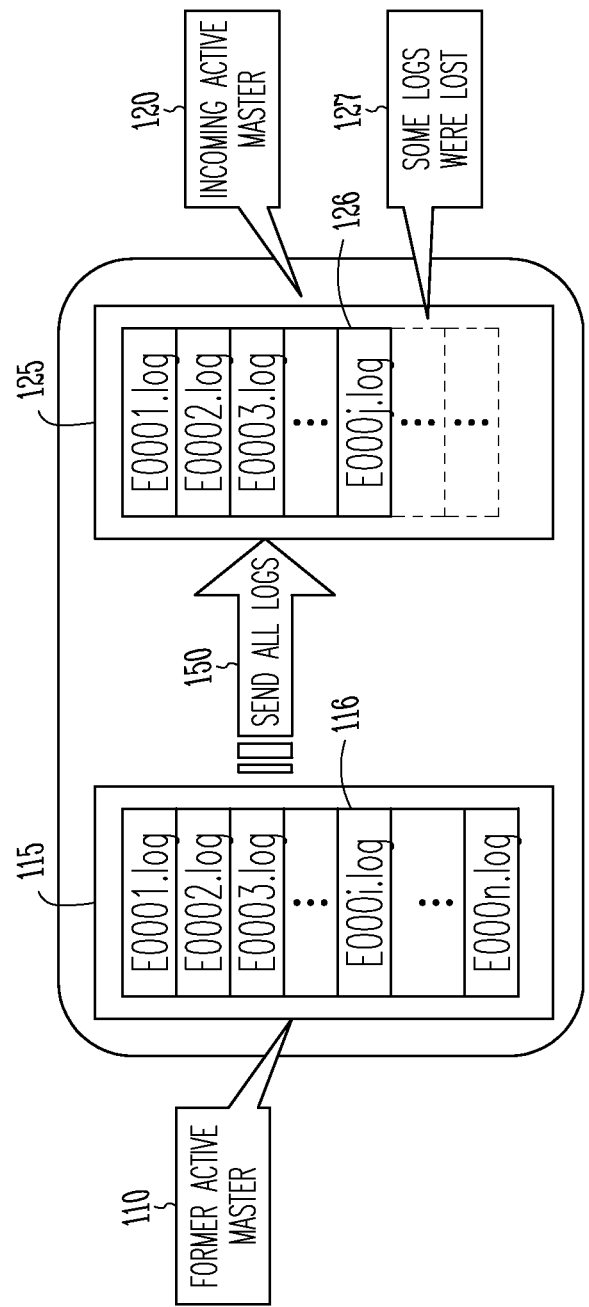
FIG. 6 illustrates a transfer of log files from a former active master to an incoming active master when an exception has occurred.
Figure 7:
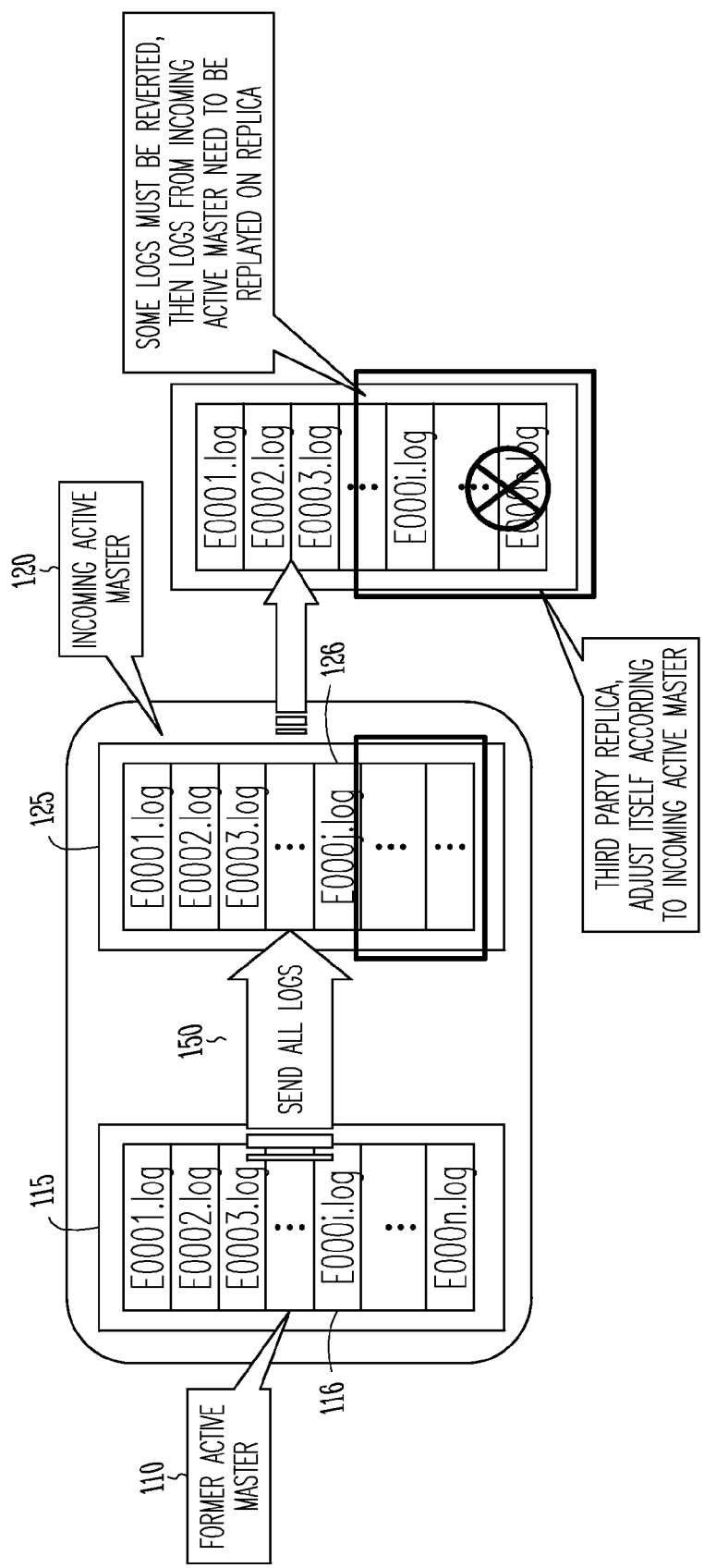
FIG. 7 illustrates the condition of FIG. 6, and a rewinding of the third party replica to resynchronize with the incoming master.
Figure 8:
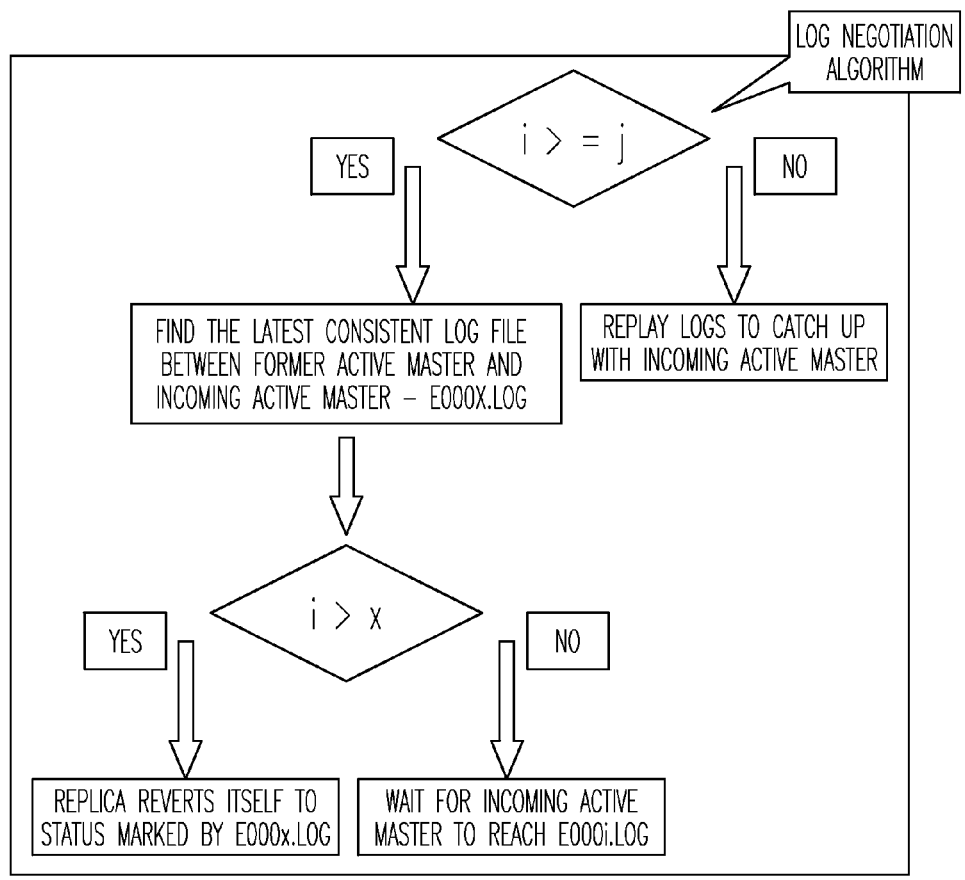
FIG. 8 is a process permitting a third party replica server to resynchronize with an incoming master server.

FIGS. 6, 7, and 8 illustrate the second scenario wherein an exception has occurred during the transfer from the former active server 110 to the incoming active (standby) server 120. Under the scenario illustrated in FIGS. 6, 7, and 8, even though there is no log file that has only been partly implemented, the log file sets 115, 125 between the former active master 110 and the incoming active (standby) master 120 are inconsistent. For example, as illustrated in FIG. 6, some log files were lost at 127. Under this condition, the incoming active master 110 will generate its own E000(j+1), E000(j+2), and other log files later on. Although these log files have the same name, the log files are different. For the third party replica 130, this means more tasks need to be done to regain consistency with the incoming active (standby) master 120, as is illustrated in FIG. 7. The search for the last consistent log between the former active master 110 and the incoming active (standby) master 120 is a priority under this situation. Specifically, the third party replica 130 must revert itself to the status marked by that log file, then replay the latest logs from the incoming active (standby) master 120. FIG. 8 illustrates this negotiation algorithm.

Figure 9:
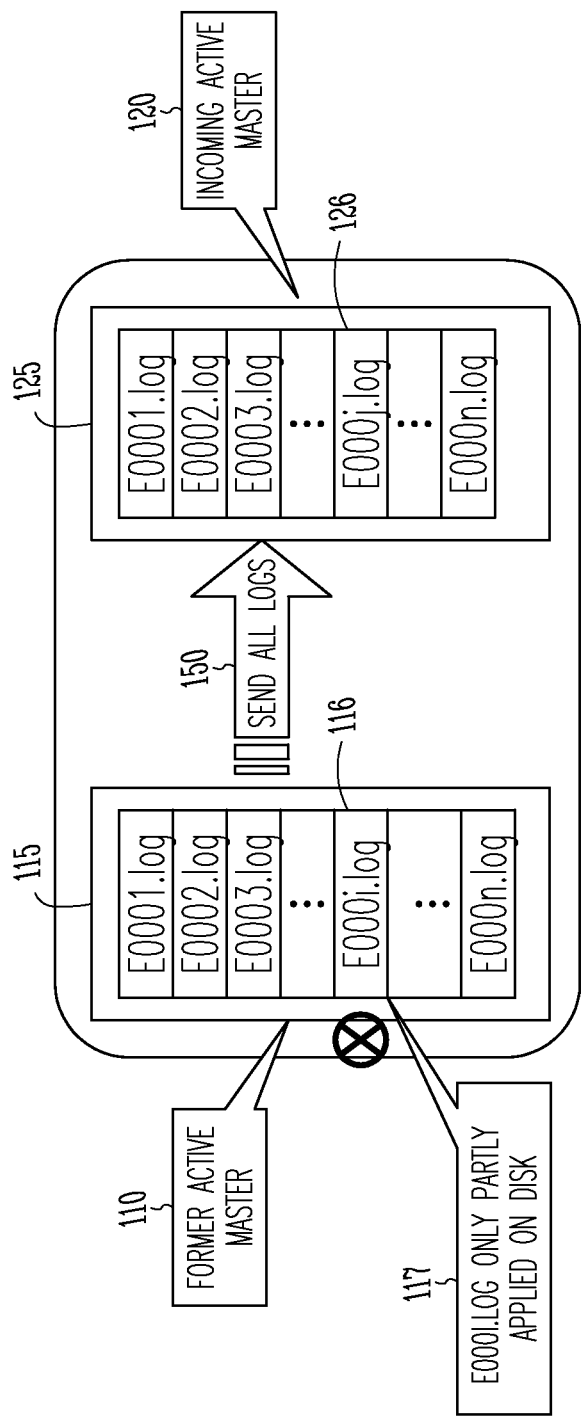
FIG. 9 illustrates a transfer of log files from a former active master to an incoming active master when an exception has occurred.
Figure 10:
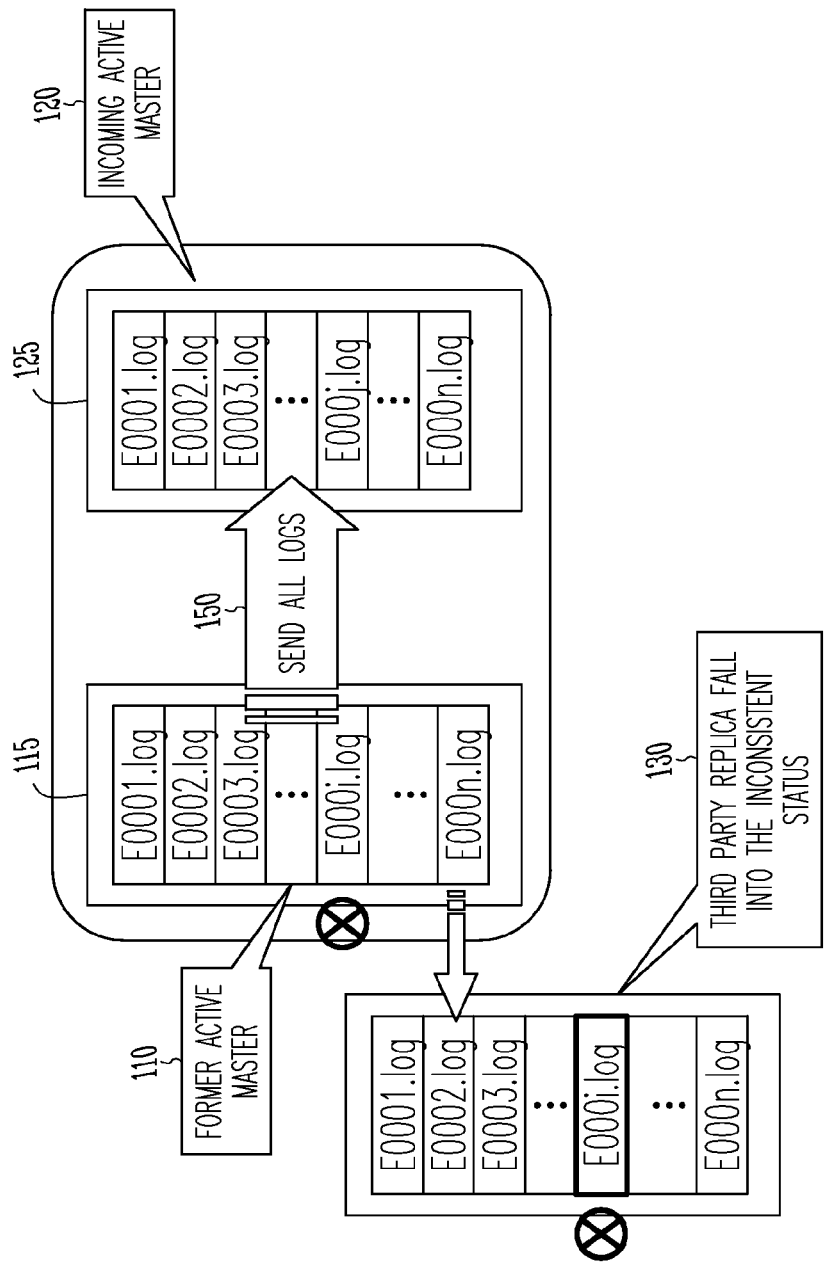
FIG. 10 illustrates the condition of FIG. 9, and a rewinding of the third party replica to resynchronize with the incoming master.
Figure 11:
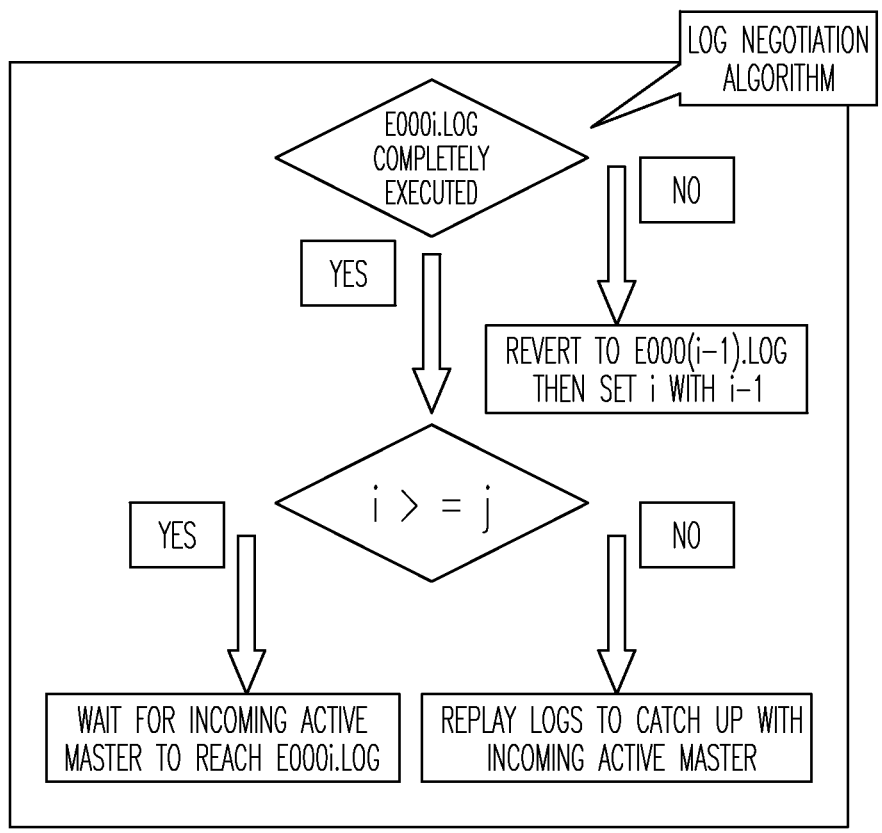
FIG. 11 is a process permitting a third party replica server to resynchronize with an incoming master server.

FIGS. 9, 10, and 11 illustrate the third scenario wherein the transfer between the active master 110 and the standby master 120 is done with an exception. Under the third scenario, the log file sets 115, 125 between the former active master 110 and the incoming active (standby) master 120 are exactly the same, whereas the log file being executed by the former active master 110 at the moment of transfer failed to execute completely at 117 as illustrated in FIG. 9. To further illustrate, assume that E000i.log is the log being processed when a fault prevents it from being completely implemented, which puts the database system into an inconsistent situation. Similarly, for the third party replica 130 that closely follows the active master 110, the situation is illustrated in FIG. 10. However, under the condition illustrated in FIG. 10, the only action that the third party replica 130 needs to perform is to revert to the E000(i−1).log, and then begin to accept logs from the incoming (standby) master 120, as illustrated in FIG. 11.

Figure 12:
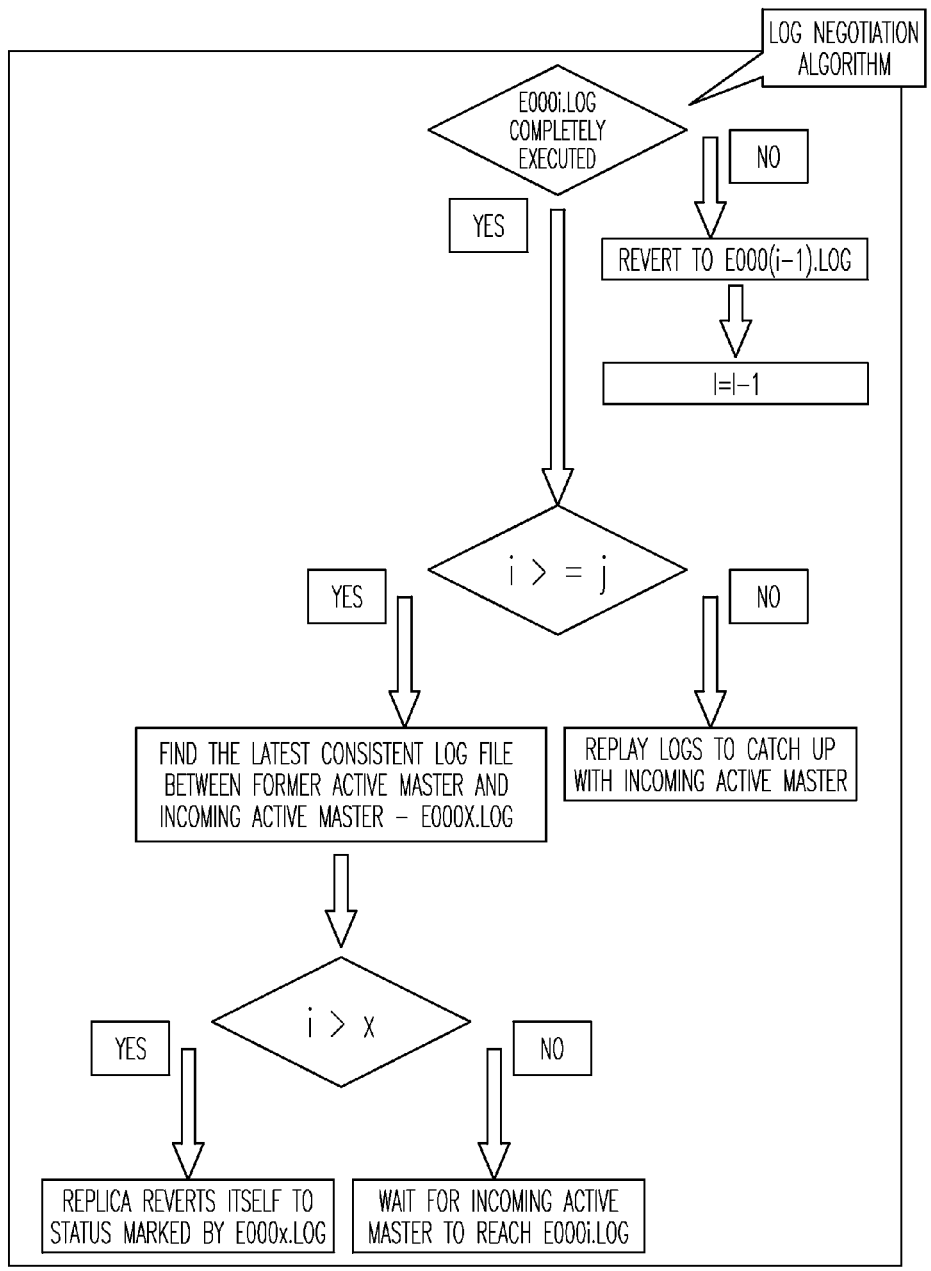
FIG. 12 illustrates an aggregate solution that permits a third party replica to avoid resynchronization.
Figure 13A:
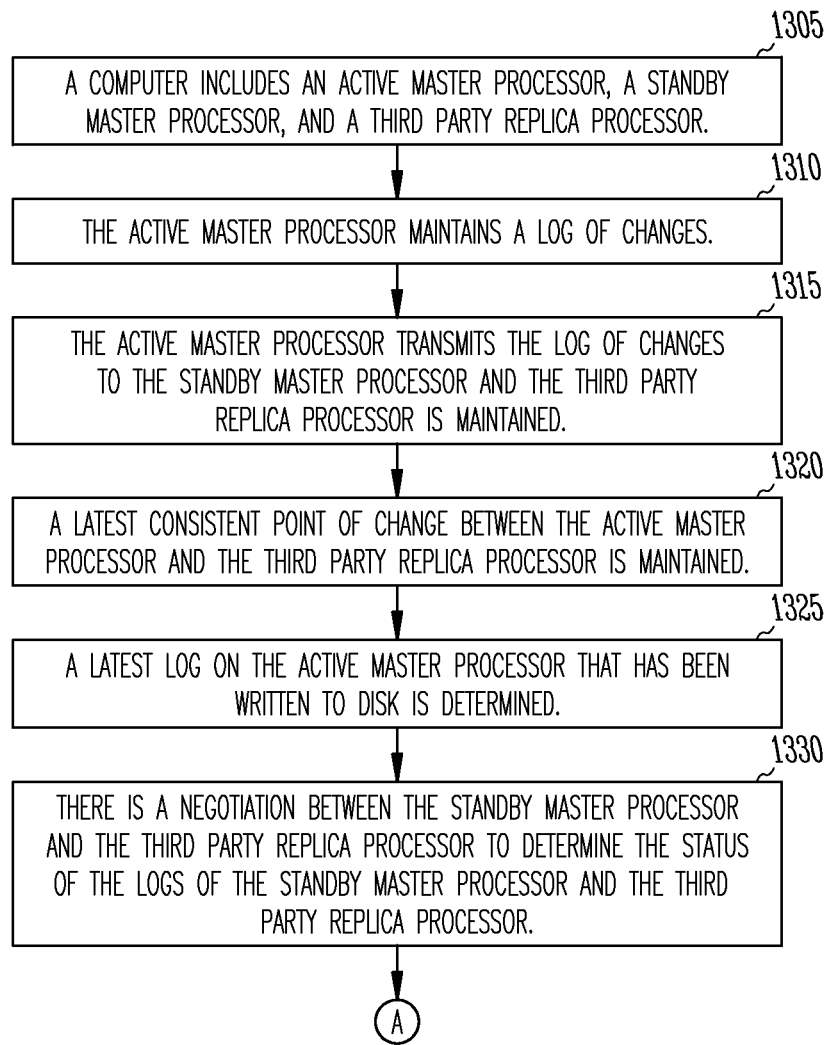
FIGS. 13A through 13F are a flowchart of an example embodiment of a process to avoid resynchronization when protecting multiple servers.
Figure 13B:
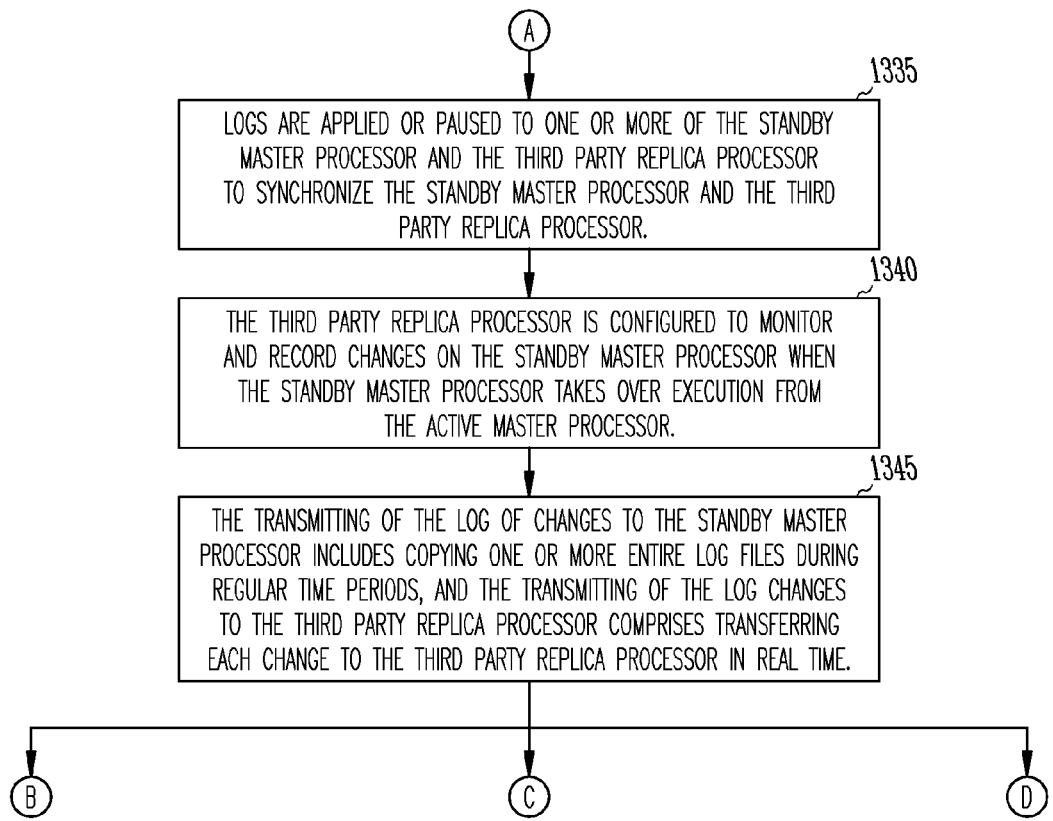
Figure 13C:
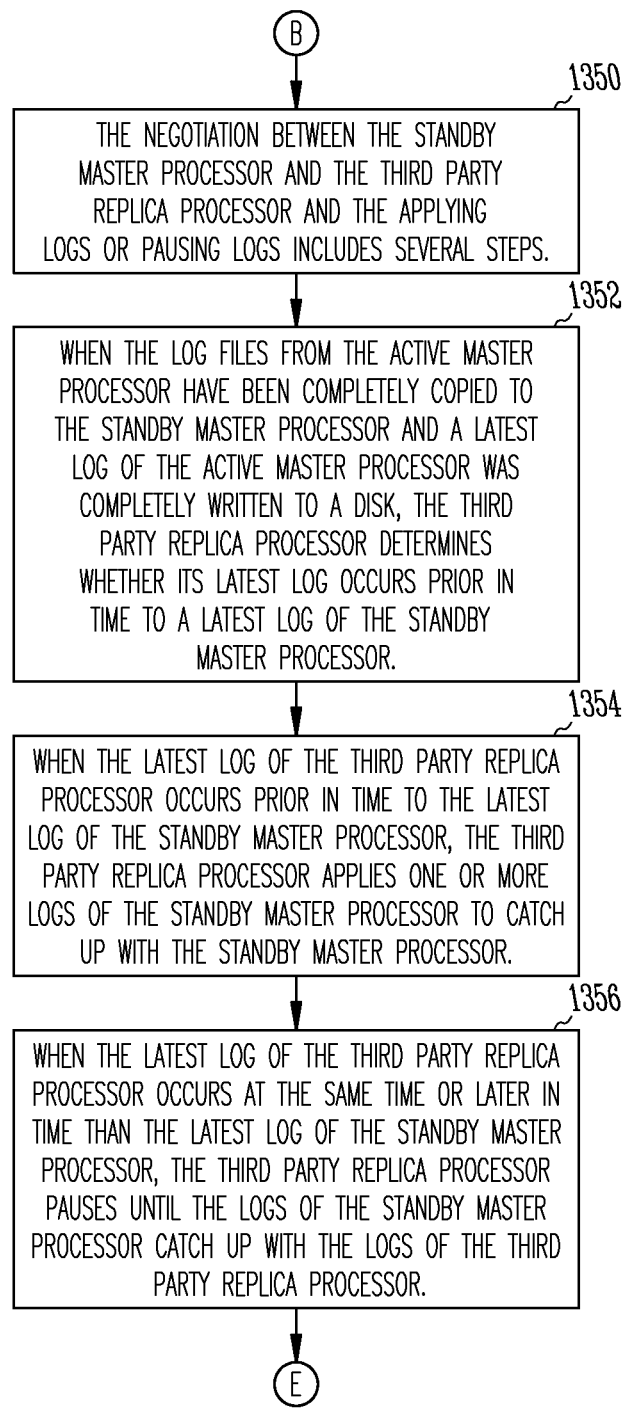
Figure 13D:
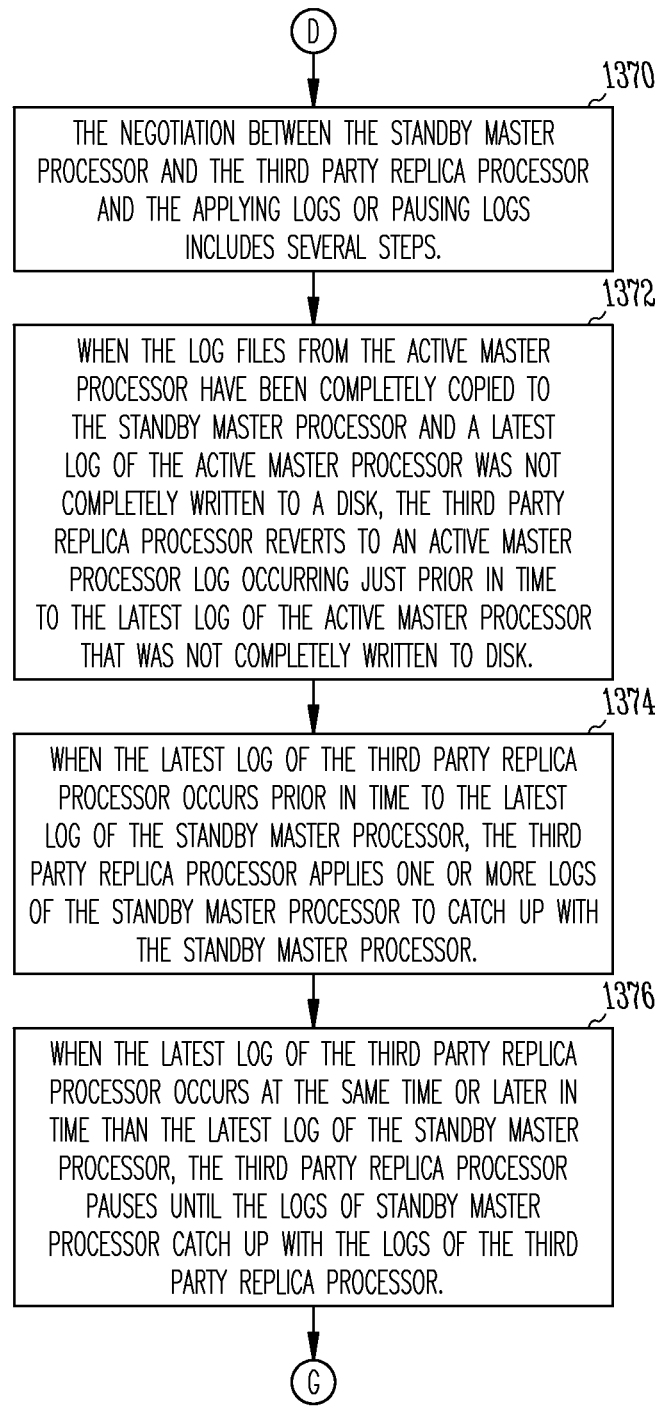
Figure 13E:
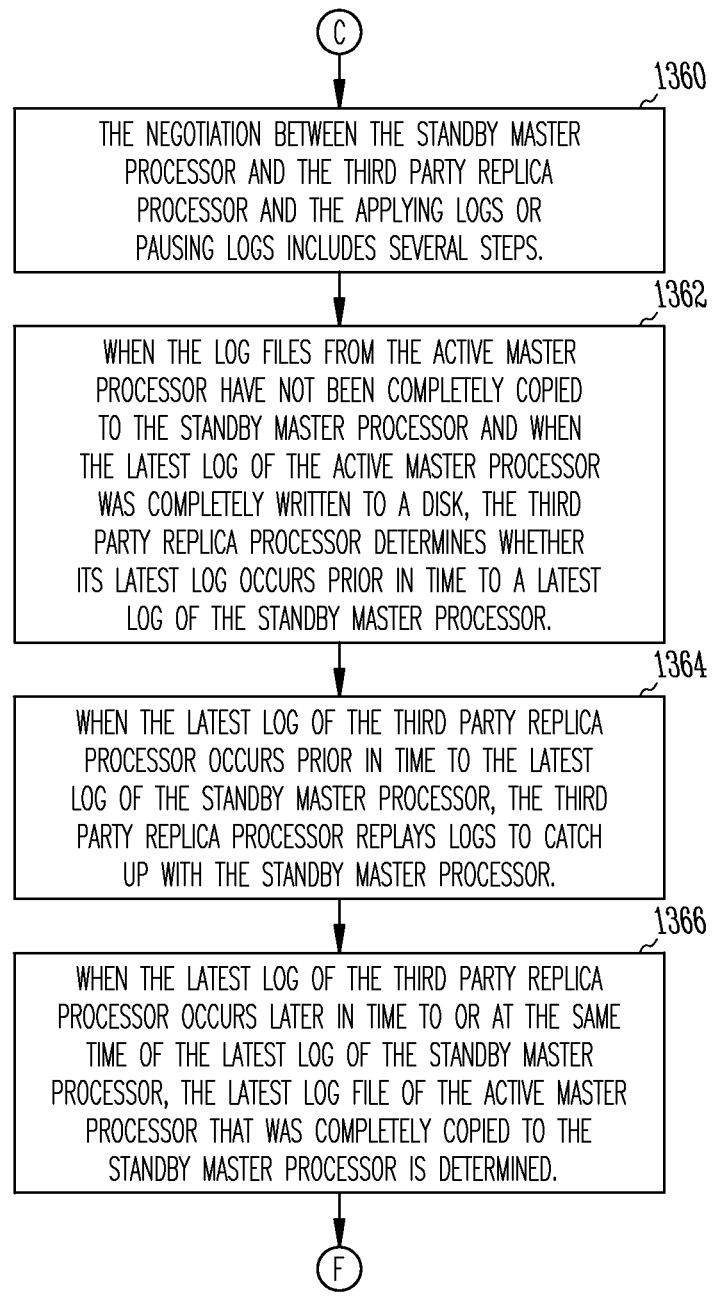
Figure 13F:
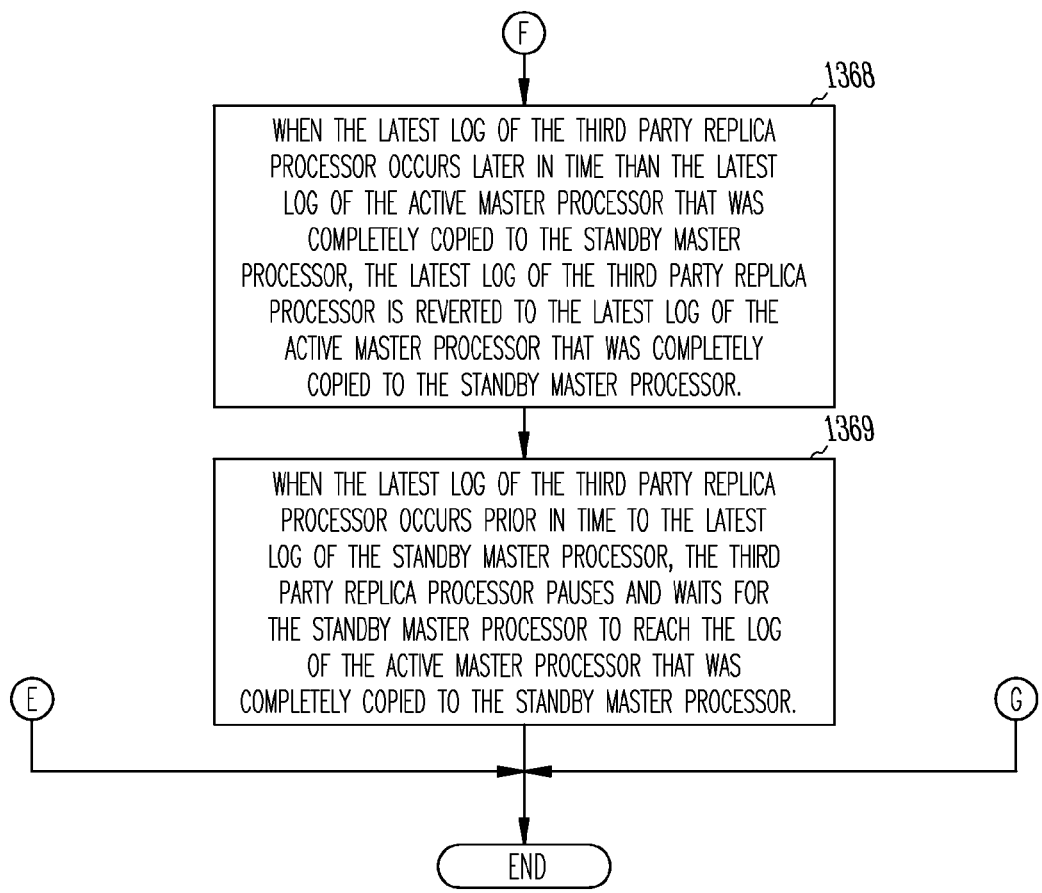

To handle all the above situations, an aggregate solution is illustrated in FIG. 12. With the aid of the log negotiation algorithm of FIG. 12, the third party replica 130 can redirect its protection towards the incoming active (standby) master 120 without a time consuming resynchronization. In this way, continuous protection can be achieved with its impact on the system environment mitigated to a low level. In an embodiment, the third party replica 130 will be able to provide protection to a server matrix consisting of active and passive nodes more efficiently. Once the active role is transferred, there is no need to do another round of full synchronization, a log negotiation as disclosed herein will suffice.

FIGS. 13A through 13F are a flowchart of an example embodiment of a process to avoid resynchronization when protecting multiple servers. FIGS. 13A through 13F include a number of process blocks 1305-1380. Though arranged serially in the example of FIGS. 13A through 13F, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring specifically to FIGS. 13A through 13F, at 1305, a computer system includes an active master processor, a standby master processor, and a third party replica processor. The standby master processor is configured to serve as a backup processor for the active master processor. The third party replica processor is configured to monitor and record changes on the active master processor when the active master processor is executing. The third party replica processor is further configured to synchronize itself with the standby master processor when the standby master processor takes over execution from the active master processor. At 1310, the active master processor maintains a log of changes. At 1315, the active master processor transmits the log of changes to the standby master processor and the third party replica processor. At 1320, a latest consistent point of change between the active master processor and the third party replica processor is maintained. At 1325, a latest log on the active master processor that has been written to disk is determined. At 1330, there is a negotiation between the standby master processor and the third party replica processor to determine the status of the logs of the standby master processor and the third party replica processor. At 1335, logs are applied or paused to one or more of the standby master processor and the third party replica processor to synchronize the standby master processor and the third party replica processor.

At 1340, the third party replica processor is configured to monitor and record changes on the standby master processor when the standby master processor takes over execution from the active master processor. At 1345, the transmitting of the log of changes to the standby master processor includes copying one or more entire log files during regular time periods, and the transmitting of the log of changes to the third party replica processor comprises transferring each change to the third party replica processor in real time.

At 1350, the negotiation between the standby master processor and the third party replica processor and the applying logs or pausing logs includes several steps. First, at 1352, when the log files from the active master processor have been completely copied to the standby master processor and a latest log of the active master processor was completely written to a disk, the third party replica processor determines whether its latest log occurs prior in time to a latest log of the standby master processor. At 1354, when the latest log of the third party replica processor occurs prior in time to the latest log of the standby master processor, the third party replica processor applies one or more logs of the standby master processor to catch up with the standby master processor. At 1356, when the latest log of the third party replica processor occurs at the same time or later in time than the latest log of the standby master processor, the third party replica processor pauses until the logs of the standby master processor catch up with the logs of the third party replica processor.

At 1360, the negotiation between the standby master processor and the third party replica processor and the applying logs or pausing logs includes several steps. At 1362, when the log files from the active master processor have not been completely copied to the standby master processor and when the latest log of the active master processor was completely written to a disk, the third party replica processor determines whether its latest log occurs prior in time to a latest log of the standby master processor. At 1364, when the latest log of the third party replica processor occurs prior in time to the latest log of the standby master processor, the third party replica processor replays logs to catch up with the standby master processor. At 1366, when the latest log of the third party replica processor occurs later in time to or at the same time of the latest log of the standby master processor, the latest log file of the active master processor that was completely copied to the standby master processor is determined. At 1368, when the latest log of the third party replica processor occurs later in time than the latest log of the active master processor that was completely copied to the standby master processor, the latest log of the third party replica processor is reverted to the latest log of the active master processor that was completely copied to the standby master processor. At 1369, when the latest log of the third party replica processor occurs prior in time to the latest log of the standby master processor, the third party replica processor pauses and waits for the standby master processor to reach the log of the active master processor that was completely copied to the standby master processor.

At 1370, the negotiation between the standby master processor and the third party replica processor and the applying logs or pausing logs includes several steps. At 1372, when the log files from the active master processor have been completely copied to the standby master processor and a latest log of the active master processor was not completely written to a disk, the third party replica processor reverts to an active master processor log occurring just prior in time to the latest log of the active master processor that was not completely written to disk. At 1374, when the latest log of the third party replica processor occurs prior in time to the latest log of the standby master processor, the third party replica processor applies one or more logs of the standby master processor to catch up with the standby master processor. At 1376, when the latest log of the third party replica processor occurs at the same time or later in time than the latest log of the standby master processor, the third party replica processor pauses until the logs of the standby master processor catch up with the logs of the third party replica processor.

At 1380, the transmitting of the log of changes to the standby master processor includes copying one or more entire log files during regular time periods, and the transmitting of the log of changes to the third party replica processor comprises transferring each change to the third party replica processor in real time.

Figure 14:
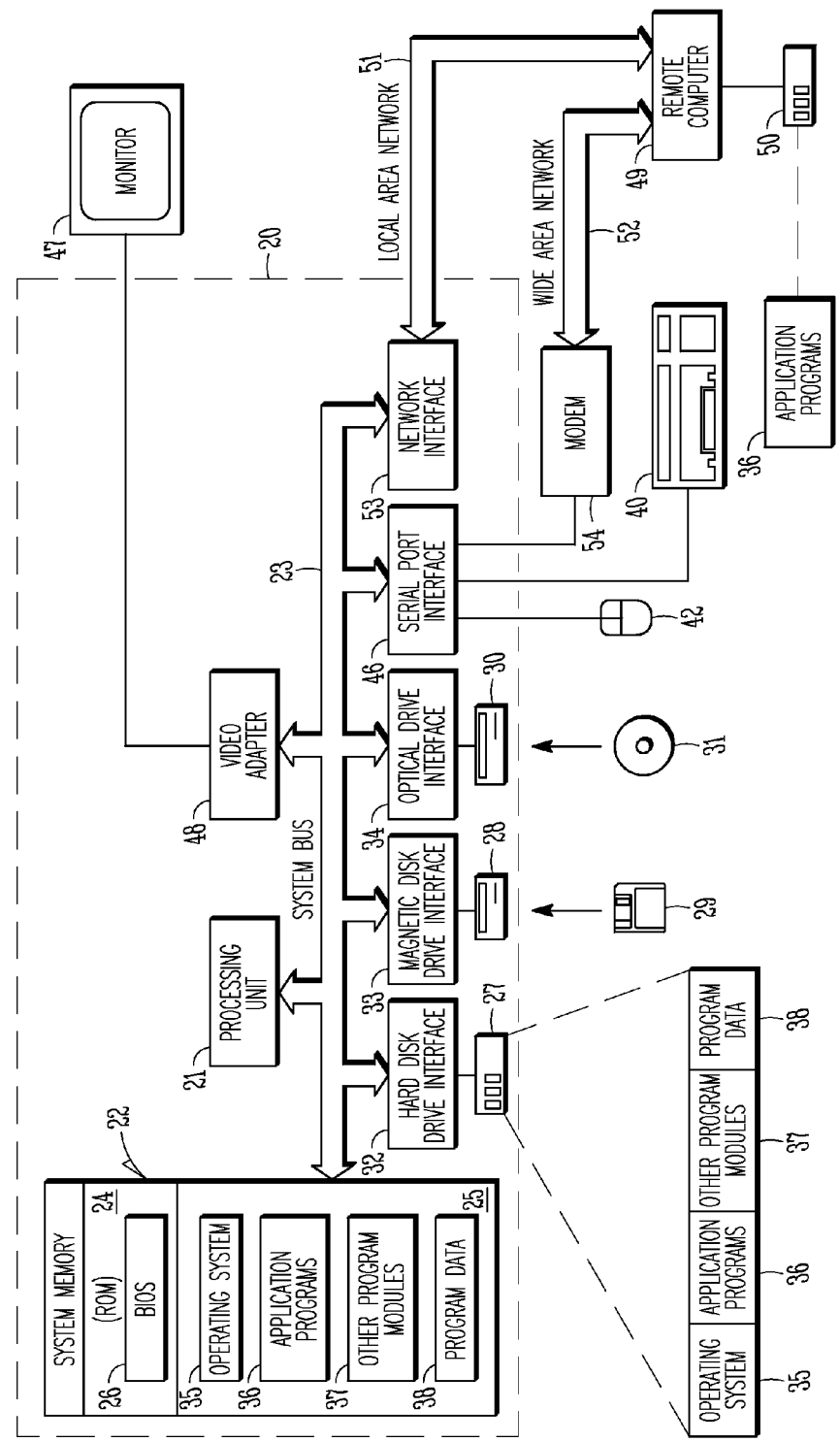
FIG. 14 is a block diagram of a computer system in connection with which one or more embodiments of the current disclosure can execute.

FIG. 14 is an overview diagram of a hardware and operating environment in conjunction with which embodiments of the invention may be practiced. The description of FIG. 14 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 14, a hardware and operating environment is provided that is applicable to any of the servers and/or remote clients shown in the other Figures.

As shown in FIG. 14, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 14 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for avoiding resynchronization when protecting multiple servers has been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process comprising:
   providing in a computer system an active master processor, a standby master processor, and a third party replica processor, wherein the standby master processor is configured to serve as a backup processor for the active master processor, the third party replica processor is configured to monitor and record changes on the active master processor when the active master processor is executing, and the third party replica processor is further configured to synchronize itself with the standby master processor when the standby master processor takes over execution from the active master processor; wherein the configurations of the active master processor, the standby master processor, and the third party replica processor comprise:
   maintaining a log of changes within the active master processor;
   transmitting the log of changes to the standby master processor and the third party replica processor;
   maintaining a latest consistent point of change between the active master processor and the third party replica processor;
   determining a latest log on the active master processor that has been written to disk;
   negotiating between the standby master processor and the third party replica processor to determine the status of the logs of the standby master processor and the third party replica processor; and
   applying logs or pausing logs to one or more of the standby master processor and the third party replica processor to synchronize the standby master processor and the third party replica processor;
   wherein the negotiating between the standby master processor and the third party replica processor and the applying logs or pausing logs comprises:
      when the log files from the active master processor have not been completely copied to the standby master processor and when the latest log of the active master processor was completely written to a disk, configuring the third party replica processor to determine whether its latest log occurs prior in time to a latest log of the standby master processor,
      when the latest log of the third party replica processor occurs prior in time to the latest log of the standby master processor, configuring the third party replica processor to replay logs to catch up with the standby master processor;
      when the latest log of the third party replica processor occurs later in time to or at the same time of the latest log of the standby master processor, determining the latest log file of the active master processor that was completely copied to the standby master processor, and
      when the latest log of the third party replica processor occurs later in time than the latest log of the active master processor that was completely copied to the standby master processor, reverting the latest log of the third party replica processor to the latest log of the active master processor that was completely copied to the standby master processor, and
      when the latest log of the third party replica processor occurs prior in time to the latest log of the standby master processor, configuring the third party replica processor to pause and wait for the standby master processor to reach the log of the active master processor that was completely copied to the standby master processor.

2. The process of claim 1, wherein the third party replica processor is configured to monitor and record changes on the standby master processor when the standby master processor takes over execution from the active master processor.

3. The process of claim 1, wherein the negotiating between the standby master processor and the third party replica processor and the applying logs or pausing logs comprises:
   when the log files from the active master processor have been completely copied to the standby master processor and a latest log of the active master processor was completely written to a disk, configuring the third party replica processor to determine whether its latest log occurs prior in time to a latest log of the standby master processor, and
      when the latest log of the third party replica processor occurs prior in time to the latest log of the standby master processor, the third party replica processor applies one or more logs of the standby master processor to catch up with the standby master processor, and
      when the latest log of the third party replica processor occurs at the same time or later in time than the latest log of the standby master processor, the third party replica processor pauses until the logs of the standby master processor catch up with the logs of the third party replica processor.

4. The process of claim 1, wherein the negotiating between the standby master processor and the third party replica processor and the applying logs or pausing logs comprises:
   when the log files from the active master processor have been completely copied to the standby master processor and a latest log of the active master processor was not completely written to a disk,
      configuring the third party replica processor to revert to an active master processor log occurring just prior in time to the latest log of the active master processor that was not completely written to disk,
      when the latest log of the third party replica processor occurs prior in time to the latest log of the standby master processor, the third party replica processor applies one or more logs of the standby master processor to catch up with the standby master processor, and
      when the latest log of the third party replica processor occurs at the same time or later in time than the latest log of the standby master processor, the third party replica processor pauses until the logs of the standby master processor catch up with the logs of the third party replica processor.

5. The process of claim 1, wherein the transmitting the log of changes to the standby master processor comprises copying one or more entire log files during regular time periods, and the transmitting the log of changes to the third party replica processor comprises transferring each change to the third party replica processor on a real time basis.

6. A non-transitory computer readable medium comprising instructions that when executed by one or more of an active master processor, a standby master processor, and a third party replica processor, execute a process comprising:
- maintaining a log of changes within the active master processor;
- transmitting the log of changes to the standby master processor and the third party replica processor;
- maintaining a latest consistent point of change between the active master processor and the third party replica processor;
- determining a latest log on the active master processor that has been written to disk, rather than the latest log not being completely written to disk such that some modifications of the latest log are not applied;
- negotiating between the standby master processor and the third party replica processor to determine the status of the logs of the standby master processor and the third party replica processor; and
- applying logs and pausing logs to one or more of the standby master processor and the third party replica processor to synchronize the standby master processor and the third party replica processor;

wherein the standby master processor is configured to serve as a backup processor for the active master processor, the third party replica processor is configured to monitor and record changes on the active master processor when the active master processor is executing, and the third party replica processor is further configured to synchronize itself with the standby master processor when the standby master processor takes over execution from the active master processor;

wherein the negotiating between the standby master processor and the third party replica processor and the applying logs or pausing logs comprises:
- when the log files from the active master processor have not been completely copied to the standby master processor and when the latest log of the active master processor was completely written to a disk, configuring the third party replica processor to determine whether its latest log occurs prior in time to a latest log of the standby master processor,
- when the latest log of the third party replica processor occurs prior in time to the latest log of the standby master processor, configuring the third party replica processor to replay logs to catch up with the standby master processor;
- when the latest log of the third party replica processor occurs later in time to or at the same time of the latest log of the standby master processor, determining the latest log file of the active master processor that was completely copied to the standby master processor, and
- when the latest log of the third party replica processor occurs later in time than the latest log of the active master processor that was completely copied to the standby master processor, reverting the latest log of the third party replica processor to the latest log of the active master processor that was completely copied to the standby master processor, and
- when the latest log of the third party replica processor occurs prior in time to the latest log of the standby master processor, configuring the third party replica processor to pause and wait for the standby master processor to reach the log of the active master processor that was completely copied to the standby master processor.

7. The non-transitory computer readable medium of claim 6, wherein the third party replica processor is configured to monitor and record changes on the standby master processor when the standby master processor takes over execution from the active master processor.

8. The non-transitory computer readable medium of claim 6, wherein the negotiating between the standby master processor and the third party replica processor and the applying logs or pausing logs comprises:
- when the log files from the active master processor have been completely copied to the standby master processor and a latest log of the active master processor was completely written to a disk, configuring the third party replica processor to determine whether its latest log occurs prior in time to a latest log of the standby master processor, and
- when the latest log of the third party replica processor occurs prior in time to the latest log of the standby master processor, the third party replica processor applies one or more logs of the standby master processor to catch up with the standby master processor, and
- when the latest log of the third party replica processor occurs at the same time or later in time than the latest log of the standby master processor, the third party replica processor pauses until the logs of the standby master processor catch up with the logs of the third party replica processor.

9. The non-transitory computer readable medium of claim 6, wherein the negotiating between the standby master processor and the third party replica processor and the applying logs or pausing logs comprises:
- when the log files from the active master processor have been completely copied to the standby master processor and a latest log of the active master processor was not completely written to a disk,
- configuring the third party replica processor to revert to an active master processor log occurring just prior in time to the latest log of the active master processor that was not completely written to disk,
- when the latest log of the third party replica processor occurs prior in time to the latest log of the standby master processor, the third party replica processor applies one or more logs of the standby master processor to catch up with the standby master processor, and
- when the latest log of the third party replica processor occurs at the same time or later in time than the latest log of the standby master processor, the third party replica processor pauses until the logs of the standby master processor catch up with the logs of the third party replica processor.

10. The non-transitory computer readable medium of claim 6, wherein the transmitting the log of changes to the standby master processor comprises copying one or more entire log files during regular time periods, and the transmitting the log of changes to the third party replica processor comprises transferring each change to the third party replica processor on a real time basis.

11. A system comprising:
- an active master processor, a standby master processor, and a third party replica processor, wherein the standby master processor is configured to serve as a backup processor for the active master processor, the third party replica processor is configured to monitor and record changes on the active master processor when the active master processor is executing, and the third party replica processor is further configured to synchronize itself with the standby master processor when the standby master processor takes over execution from the active master processor; wherein the configurations of the active master processor, the standby master processor, and the third party replica processor comprise:
- maintaining a log of changes within the active master processor;
- transmitting the log of changes to the standby master processor and the third party replica processor;
- maintaining a latest consistent point of change between the active master processor and the third party replica processor;
- determining a latest log on the active master processor that has been written to disk;
- negotiating between the standby master processor and the third party replica processor to determine the status of the logs of the standby master processor and the third party replica processor; and
- applying logs or pausing logs to one or more of the standby master processor and the third party replica processor to synchronize the standby master processor and the third party replica processor;
- wherein the negotiating between the standby master processor and the third party replica processor and the applying logs or pausing logs comprises:
  - when the log files from the active master processor have not been completely copied to the standby master processor and when the latest log of the active master processor was completely written to a disk, configuring the third party replica processor to determine whether its latest log occurs prior in time to a latest log of the standby master processor,
  - when the latest log of the third party replica processor occurs prior in time to the latest log of the standby master processor, configuring the third party replica processor to replay logs to catch up with the standby master processor;
  - when the latest log of the third party replica processor occurs later in time to or at the same time of the latest log of the standby master processor, determining the latest log file of the active master processor that was completely copied to the standby master processor, and
  - when the latest log of the third party replica processor occurs later in time than the latest log of the active master processor that was completely copied to the standby master processor, reverting the latest log of the third party replica processor to the latest log of the active master processor that was completely copied to the standby master processor, and
  - when the latest log of the third party replica processor occurs prior in time to the latest log of the standby master processor, configuring the third party replica processor to pause and wait for the standby master processor to reach the log of the active master processor that was completely copied to the standby master processor.

12. The system of claim 11, wherein the third party replica processor is configured to monitor and record changes on the standby master processor when the standby master processor takes over execution from the active master processor.

13. The system of claim 11, wherein the negotiating between the standby master processor and the third party replica processor and the applying logs or pausing logs comprises:
- when the log files from the active master processor have been completely copied to the standby master processor and a latest log of the active master processor was completely written to a disk, configuring the third party replica processor to determine whether its latest log occurs prior in time to a latest log of the standby master processor, and
  - when the latest log of the third party replica processor occurs prior in time to the latest log of the standby master processor, the third party replica processor applies one or more logs of the standby master processor to catch up with the standby master processor, and
  - when the latest log of the third party replica processor occurs at the same time or later in time than the latest log of the standby master processor, the third party replica processor pauses until the logs of the standby master processor catch up with the logs of the third party replica processor.

14. The system of claim 11, wherein the negotiating between the standby master processor and the third party replica processor and the applying logs or pausing logs comprises:
- when the log files from the active master processor have been completely copied to the standby master processor and a latest log of the active master processor was not completely written to a disk,
- configuring the third party replica processor to revert to an active master processor log occurring just prior in time to the latest log of the active master processor that was not completely written to disk,
  - when the latest log of the third party replica processor occurs prior in time to the latest log of the standby master processor, the third party replica processor applies one or more logs of the standby master processor to catch up with the standby master processor, and
  - when the latest log of the third party replica processor occurs at the same time or later in time than the latest log of the standby master processor, the third party replica processor pauses until the logs of the standby master processor catch up with the logs of the third party replica processor.

15. The system of claim 11, wherein the transmitting the log of changes to the standby master processor comprises copying one or more entire log files during regular time periods, and the transmitting the log of changes to the third party replica processor comprises transferring each change to the third party replica processor on a real time basis.

* * * * *